United States Patent [19]

Sparling

[11] Patent Number: 4,993,665
[45] Date of Patent: Feb. 19, 1991

[54] DEVICE FOR ATTACHMENT TO A HELICOPTER

[76] Inventor: Fred Sparling, 122 Waterford Bridge Road, St. John's, Newfoundland, Canada, A1E 1C9

[21] Appl. No.: 312,051

[22] Filed: Feb. 17, 1989

[51] Int. Cl.$^5$ .............................................. B64D 9/00
[52] U.S. Cl. ................................ 244/118.1; 244/137.4
[58] Field of Search ............... 244/137.1, 137.4, 118.1, 244/118.5, 50, 136; 254/134.3 R

[56] References Cited

U.S. PATENT DOCUMENTS

| | | | |
|---|---|---|---|
| 2,973,923 | 3/1931 | Sznycer | 244/137.4 |
| 3,211,394 | 10/1965 | Goode | 254/134.3 R |
| 3,220,482 | 11/1965 | Eveleth | 169/1 |
| 3,273,651 | 9/1966 | Andrews | 169/1 |
| 3,381,922 | 5/1968 | Laing | 244/136 |
| 3,428,276 | 2/1969 | Hubbard | 244/136 |
| 3,485,151 | 12/1969 | Taylor | 244/137.4 |
| 3,554,468 | 1/1971 | McVicar | 244/137.4 |
| 3,714,987 | 2/1973 | Mattson | 169/2 |
| 3,719,338 | 3/1973 | Ruggeri | 244/137.4 |
| 3,749,175 | 7/1973 | Bower | 169/31 |
| 3,897,829 | 8/1975 | Eason | 169/53 |
| 3,936,018 | 2/1976 | Barlow | 244/136 |
| 4,344,489 | 8/1982 | Bonaparte | 169/70 |
| 4,376,466 | 3/1983 | Hara | 169/53 |
| 4,474,245 | 10/1984 | Arney | 169/53 |
| 4,488,612 | 12/1984 | Patterson | 244/50 |
| 4,589,614 | 5/1986 | Stevens | 244/136 |
| 4,637,575 | 1/1987 | Yenzer | 244/118.5 |

FOREIGN PATENT DOCUMENTS

| | | |
|---|---|---|
| 749750 | 1/1967 | Canada . |
| 773893 | 12/1967 | Canada . |
| 1232889 | 2/1988 | Canada . |
| 406995 | 3/1979 | Sweden .................. 254/134.3 R |

OTHER PUBLICATIONS

Arcadia Equipment Development Confer, "Improved Fire Hose Dispensing Tray for Helicopters", Report #4, 11-1956.

*Primary Examiner*—Galen Barefoot
*Attorney, Agent, or Firm*—Wenderoth, Lind & Ponack

[57] ABSTRACT

Cargo loads are frequently carried by being slung under a helicopter and carried by its cargo hook. One of the problems arising from this type of transportation is that the load is reasonably unstable relative to the helicopter, and its instability precludes certain operations which would otherwise be possible. The invention provides a device that creates the desired stability. There is described a load frame for external attachment to a helicopter by its cargo hook. The frame has a base from the upper face of which radiates a plurality of arms which engage the underside of the skids of the helicopter. By means of a winch mounted on the base, the load frame can be snugged up into a stable flight position beneath the helicopter with the arms firmly engaging the underside of the helicopter skids. There is also disclosed a reel for attachment to the load frame which conveniently can be used to pay out a fire hose or the like from the helicopter in flight.

17 Claims, 3 Drawing Sheets

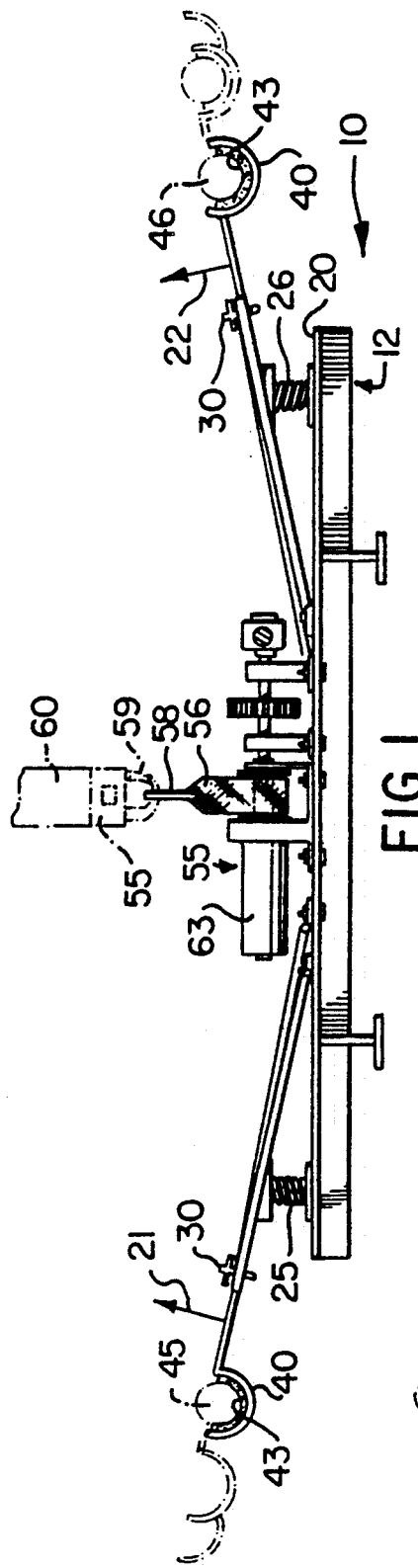
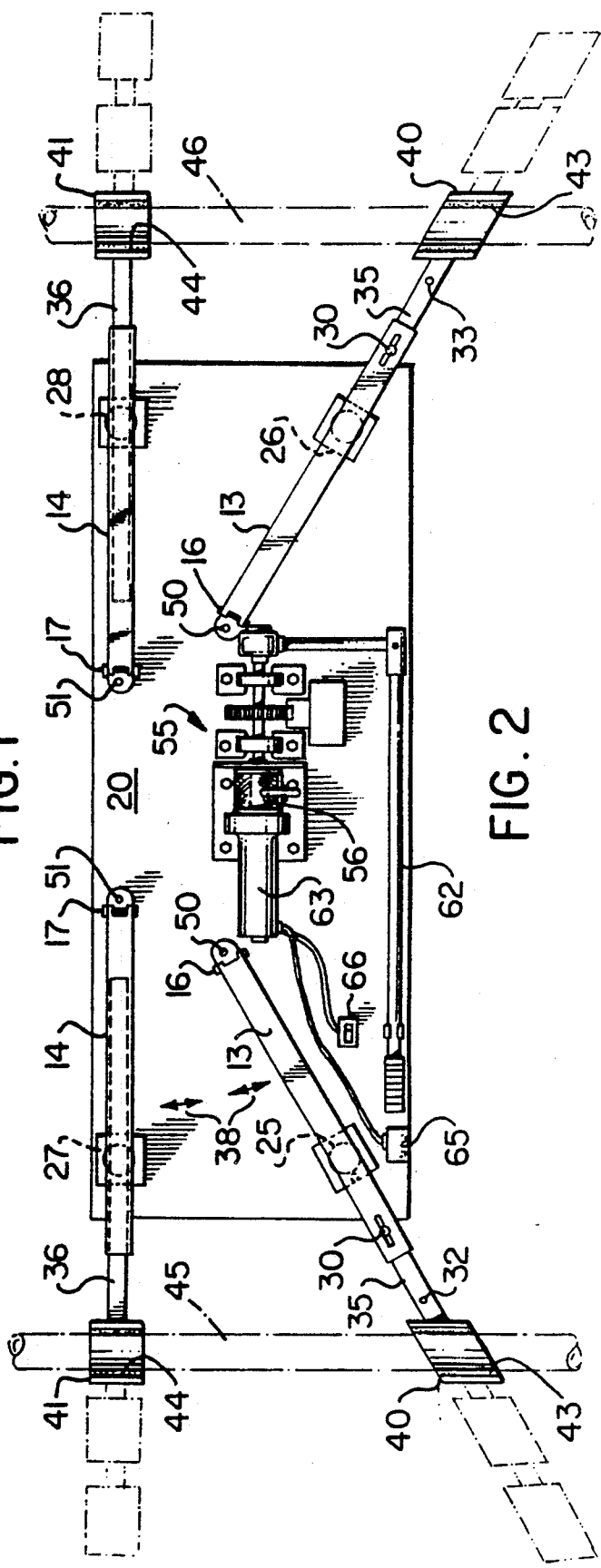

DEVICE FOR ATTACHMENT TO A HELICOPTER

BACKGROUND OF THE INVENTION

Helicopters are equipped with an external cargo hook, mounted directly under the center of gravity of the helicopter for the purpose of transporting a load externally. This enables the helicopter to transport loads which will not fit inside the helicopter. It is also a speedy and convenient way of transporting large and cumbersome loads because it is not necessary to land the helicopter and load it and then to land to unload at a final destination. Also in operating in rough terrain there may not be a suitable landing area at certain pick-up points and thus if loads could only be transported internally in the helicopter it would be necessary to first transport the load to a suitable landing area for the helicopter.

A third advantage to carrying the load externally is that greater weights can be carried. All aircraft must be flown at weights which do not exceed their authorized gross weights and almost every helicopter has a higher authorized gross weight for external than for internal loading. This is in part because an external load can be instantly released, if necessary in an emergency and consequently it is considered acceptable to push the load carrying ability of the helicopter much closer to its limits. Also the limits of the authorized gross weights is dictated by the load carrying ability of the landing gear and since an external hook operation permits the load to hang beneath the helicopter the weight of the load is not imposed on the landing gear. Yet again, some dangerous loads pose a less potential danger to the aircraft and its occupants when carried outside, rather than inside, the aircraft.

Furthermore certain equipment is designed to perform its function only while connected to the cargo hook of a helicopter such as certain types of agricultural spray booms, water buckets and aerial ignition devices.

Present external helicopter loads must first be secured either by placing the load in a net or by otherwise attaching ropes or straps, then the ends of the ropes or the rings on the perimeter of the cargo net are attached to a strap called a lanyard. The helicopter then hovers slowly and carefully over the load while a hook-up man on the ground attaches the lanyard to the helicopter's cargo hook. The pilot then moves the helicopter slowly upward until the load is in the air. At this point the load hangs at whatever attitude is dictated by the center of gravity of its mass as the helicopter moves, wind forces are introduced on the load which responds according to its own aerodynamic characteristics. Some bulky and asymmetrical loads will rotate or swing fore and aft, or swing laterally or perform some combination of these movements which become more and more pronounced as airspeed increases thus necessitating much slower flight. At the destination point the helicopter slows down until a hover is established when the load hanging again directly beneath is lowered slowly to the ground and then disengaged by a switch on the pilot's flight control.

SUMMARY OF THE INVENTION

The present invention seeks to overcome the disadvantages of unstable loads whilst maintaining the advantage of externally mounting the load on a helicopter, thereby creating new operations which may be performed by a helicopter.

It is an object of the present invention to provide a load frame which may be attached externally of a helicopter and which mounts the load thereon in stable fashion.

According to the present invention there is provided a load frame adapted for external attachment to a helicopter by its cargo hook, comprising a base means, a plurality of arms radiating from said base means and adapted to releasably engage predetermined parts on said helicopter, a strap-like member for engaging said cargo hook, and winch means on said base means adapted, in operation, to winch in said strap-like member and move said load frame into stable flight position beneath said helicopter with said arms firmly engaging said predetermined parts.

The present invention also provides a load frame adapted for external attachment to a helicopter by its cargo hook, comprising a base means having an upper face, a plurality of arms radiating from said upper face outwardly of said base means and adapted to releasably engage predetermined parts on said helicopter, a strap-like member for engaging said cargo hook, and winch means on said upper face, adapted in operation to winch-in said strap-like member and move said load frame into stable flight position beneath said helicopter with said arms firmly engaging said predetermined parts.

Preferably the arms are pivotally mounted on the upper face in horizontal pivots for pivotal movement in vertical planes, spring means biasing said arms in the vertical planes away from the upper face.

Preferably at least certain of the arms are length adjustable and in one preferred embodiment, the predetermined parts of the helicopter are its undercarriage skids. The arms may terminate in open trough-like members dimensioned to fit snuggly under the skids. Conveniently the trough-like members may be padded.

Preferably also the winch means may be manually operable or operable under power. The base may have multi-purpose load attaching means on the face remote from the upper face. According to a preferred feature the base means is skeletal in form and may have a pair of longitudinally extending inverted T-shape members projecting from the underside of the base to form a multi-purpose load attaching means.

The present invention also provides a reel for external transportation on the cargo hook of the helicopter comprising, a reel member rotatably mounted in bearings on the center tube on a upper reel support frame, means on said support frame adapted to connect said reel to a helicopter cargo and a rest frame adapted to support said reel when in ground engagement.

According to a feature of the invention there is provided a reel for transportation externally of a helicopter, comprising a main frame, means to stably mount said frame on the cargo hook of a helicopter, and a reel member operatively mounted on said main frame.

According to a further feature of the invention there is provided a reel for transportation externally of a helicopter, comprising a main frame adapted to be rigidly mounted on the underside of the load frame as hereinbefore discussed and a reel member operatively mounted on said main frame.

DESCRIPTION OF THE DRAWINGS

The following is a description by way of example of certain embodiments of the present invention reference being had to the accompanying drawings in which:

FIG. 1 is a schematic front elevation of a helicopter load frame;

FIG. 2 is a schematic plan view of the device seen in FIG. 1;

DESCRIPTION OF PREFERRED EMBODIMENTS

Figure 3:
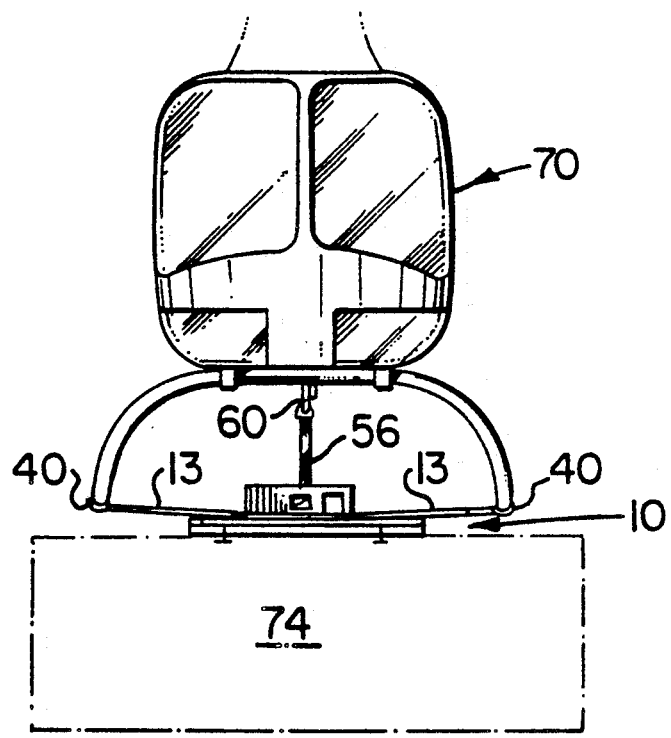
FIG. 3 is a schematic representation of the load frame in place beneath the helicopter and carrying a load.

Turning now to the drawings, a helicopter load frame 10 comprises a base means 12 (shown for the purpose of illustration as a plate). In the schematic example shown, a plurality of spring steel arms 13, 14 radiate from the base means 12. The arms are shown mounted on horizontal pivots 16, 17 on the upper face 20 of the base means. The pivots 16 and 17 permit the arms 13 and 14 to be pivoted in vertical planes about their pivots as indicated by the arrows 21, 22 in FIG. 1. Springs 25, 26, 27, 28 bias the arms in the vertical planes away from the upper face 20. The arms are telescopic and consequently length adjustable. They can be set to various lengths and locked into position, for example by means of bolts 30 which can engage in any one of a series of holes 32, 33 in the telescopic portions 35, 36 of the arms 13, 14. In the embodiment shown, the arms terminate in open trough-like members 40, 41 which are dimensioned and are preferably padded with padding (such as rubber) 43, 44, to fit snuggly under and partially about the skids 45, 46 of the helicopter to which the load frame is to be attached. By moving the telescopic parts 35, 36 of the arms 13, 14, different skid spacings, for different helicopters can readily be accommodated. Futhermore different types of trough-like members 40, 41 or trough members with different types of padding can be provided to accommodate the dimensions of various skids.

If desired, further freedom can be given to the arms 13, 14 by arranging that they are pivotally swingable in a horizontal plane about vertical pivots on the upper face 20 of the base member 12 as shown by arrows 38. In this case accomodation would be provided to reposition the springs 25, 26, 27 and 28, or they may be dispensed with.

Mounted on the base means 12, in the example shown on the upper face 20 thereof, is a winch 55. The winch 55 accommodates on a winch reel a strap-like member 56 which may be a sheer nylon strap terminating in an eye 58 for attachment to the quick release means 59 of the strap 60 of the cargo hook of the helicopter. The winch will be positioned so that where the strap-like member 56 exits its reel when it is half full it will be as close as possible to the center of gravity of the frame 10. The strap 56 may be winched by operating the ratchet of the winch manually by means of the lever 62 or, where suitable electric power is available, by means of the electric motor 63. An electrical plug 65 and switch 66 is provided for attachment to a power source and for operation of the winch 55. A release tab, on the ratchet, is provided to allow the winch to unwind fully, when the tab is actuated.

Any suitable means of mounting a load to be carried to the load frame 10 may be provided, for example bolts, or clamps which conveniently may be movable in the frame 10.

Figure 4:
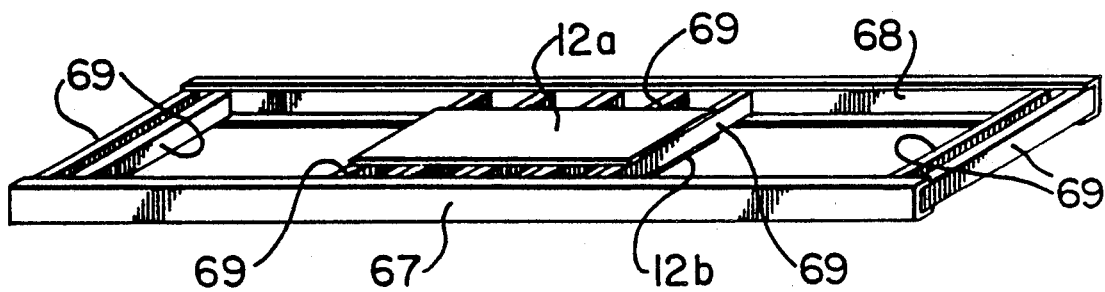
FIG. 4 is a perspective detail of one practical form of base for the load frame.

In reality, the load frame 10 may suitably be formed of skeletal construction such as seen in FIG. 4 where a plurality of inwardly directed channel members 67, 68 embrace transversely arranged, spaced cross-members which may be light-weight rectangular section tubes 69. The base means 12 is here shown as upper and under plates 12a, 12b.

In FIG. 3 the load frame 10 is shown in position with the arms extended so that the trough-like members 40, 41 engage the skids of the helicopter 70. The strap 56 attaching the load frame 10 to the cargo hook 60 of the helicopter and a load 74 being secured to the underside of the base means 12 by means of suitable clamps.

Figure 5:
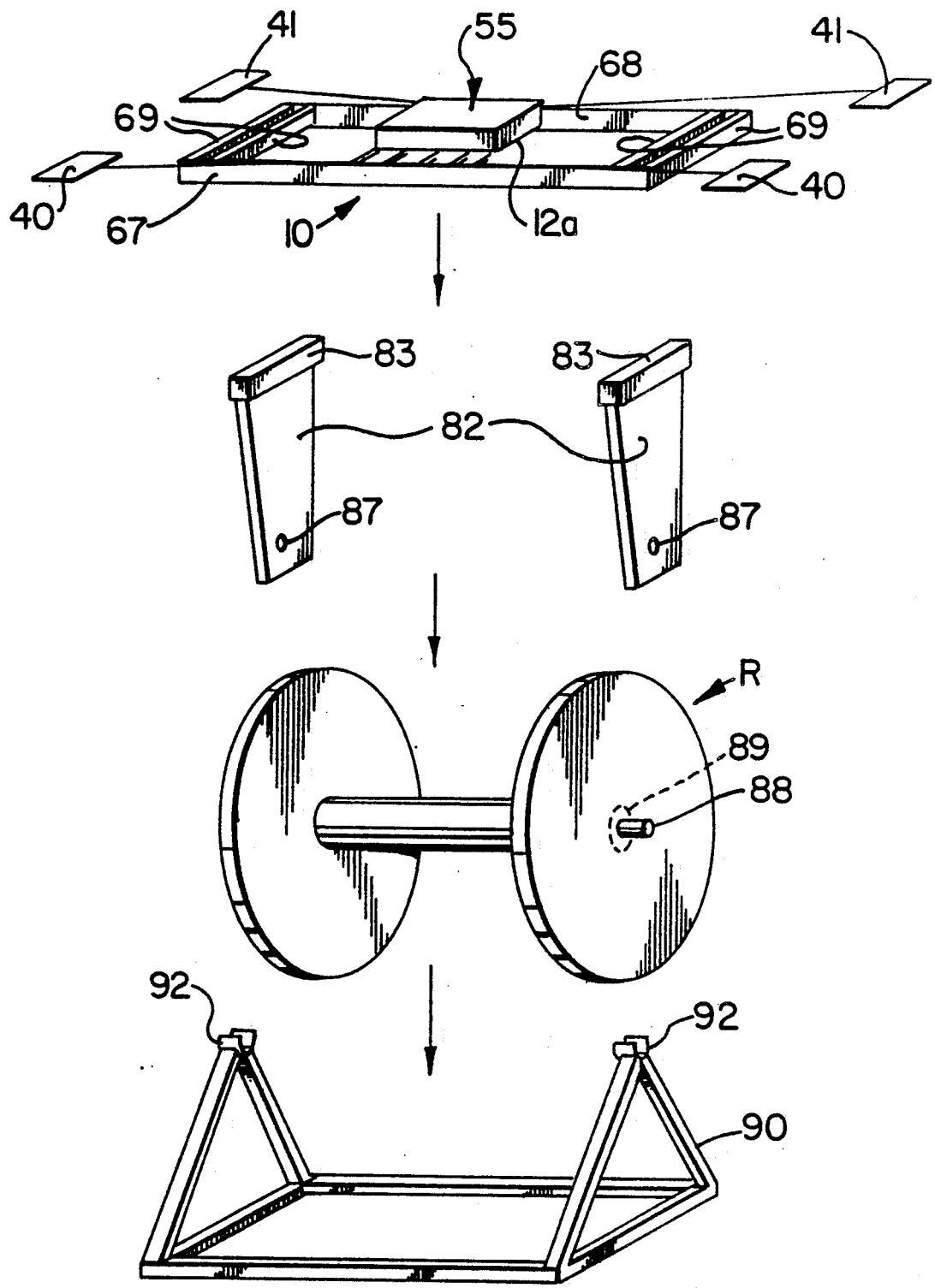
FIG. 5 is a detail of a reel as one suitable form of load to be carried by the load frame.

In FIG. 5 there is shown a configuration for mounting a reel R on and beneath the load frame 10. A pair of side-wings 82 are provided which may be positioned so as to extend through the space between the outer end pairs of cross-member 69 and down beneath the load frame 10. The side-wings 82 are dimensioned so as to fit snugly both longitudinally and laterally within the space and be constrained therein. The side-wings 82 have upper sections which are dimensioned and shaped so as to fit on top of the outer end pairs of cross-members 92 and may, if denied, be locked, removably, or permanently to the load frame 10. The side wings 82 have holes 87 which accommodate the protruding ends 88 of the central reel shaft. The shaft 88 is mounted in bearings 89 in the reel R so that the reel may be freely rotated. The weight of the reel R acts to maintain the upper sections of the side-wings 82 in place on the load frame 10. If desired, a rest frame 90 may be provided with U-shaped channels 92 adapted to receive the extending portions 88 of the shaft. When disengaged from the helicopter cargo hook the rest frame 90 sits on the ground and supports the reel R. If desired, to be transported, with the reel R, the frame 90 can be fixed to the shaft portions 88. Suitable remote controlled, reel locking or breaking means may be provided to govern reel rotation in the bearings 89 during flight, or otherwise.

IN OPERATION

A load to be attached to the underside of the load frame 10 will be positioned such that its weight is resolved directly under the strap-like member 56 of the winch 55. The load to be transported will be initially picked-up in the conventional manner, then while the helicopter maintains its hover, the hook-up-man on the ground will operate the winch 55 to winch-in the load until the arms 13, 14 snugly engage with the underside of the skids with sufficient force to stabilize the entire load. By observing the compression of the springs 25, 26 beneath the arms 13, 14, the hook-up-man can determine when the correct degree of snugness has been achieved. The springs 25, 26 also act as shock dampers.

If, according to the nature of the load being transported, some manner of electrical control of the load is required during flight, this control will be achieved by means of an electrical wire (from the load to the cabin of the helicopter) which wire is connected through a quick disconnect fitting, thus preserving the jettisonable feature of the load. Thus, if during flight it is required to immediately release the load, then engagement of the cargo hook release will immediately jettison the load, the quick disconnect fitting acting to disconnect the wire. Under normal situations when the mission is completed, the helicopter will slowly lower the load until it contacts the ground then release it.

A significant use of the load frame 10 is with a cable, hose, or like, reel such as seen in FIG. 5.

If the reel were attached in a conventional manner, without the load frame 10, to the single suspension point of the cargo hook of the helicopter, that reel would necessarly move in response to the gravitational and aerodynamic forces it encounters and also in response to the arbitrary forces produced by the material that is unwound from the reel, as unwinding takes place. Thus, maintaining alignment of the reel and its effective use would be not possible. The stability produced by securely attaching by the load frame 10 overcomes these problems and enables the reel to be unwound in flight. Furthermore, the fact that the reel is attached beneath the helicopter on the load frame 10 enables a reel of considerable size to be used. If a reel of large size were mounted other than in the fashion of the present invention, that is to say if an attempt were made to mount the large reel above the skids on either side of the helicopter, such a reel would be of such significant weight as to exceed the lateral center of gravity limits of the aircraft. Further if the reel were to be attached to the aircraft as a permanent attachment then the aircraft would have to be designed according to the particular hard-points that are available in that aircraft for mounting equipment. Thus such equipment would become specific to a particular type of aircraft and unable to be used with different types of helicopter. The present invention enables the reel to be mounted in a stable fashion such that the reel would be capable of unwinding material across the surface that the helicopter traverses. As indicated, such material could be a fire-fighting hose for deployment at the scene of a forest fire, a wire or fiber optics cable for communication purposes; a rope or cable for rescue purposes, or any number of other wires or lines or the like.

Furthermore the load frame 10 is adapted to many other types of operation presently used in helicopters. It is known to use a self-standing totally self-contained agriculture spray system which is attached to the cargo hook of a helicopter but because the equipment is free to swing on the cargo hook, problems are encountered and maneuvers must be conducted slowly and carefully, this is an undesirable necessity in crop-spraying.

A second system presently available is a solidly mounted agricultural spray equipment system. These suffer from the problem that they are not instantly jettisonable, they are expensive and time consuming to install and they are specific to a type of aircraft.

An agricultural spray system when securely attached to the load frame 10 of the present invention combines all the advantages of external loading whilst eliminating the disadvantages of instability. Probably in such an application, the agricultural spray system would be permanently attached to the load frame 10 but would be suitable for use with a wide range of helicopters because of the adjustability of the arms 13, 14.

A further application of the load frame 10 of the present invention is that of mounting a camera with its appropriate support and control mechanisms to the load frame 10 so that it could be attached to the cargo hook of the helicopter, eliminating many of the disadvantages with current camera mounts and, if desired, the additional advantage could be obtained by providing a full 360° unobstructed horizontal camera view.

Still a further application of the load frame 10 of the present invention is that it can mount on its top, light loads, such as search lights, light military equipment, and the like, which hitherto would likely have been attached to hard points on the helicopter. In such applications the winch would be activated beyond the point shown in FIG. 3 to the point where the springs 25 26, if provided, would be fully compressed and advantage taken of the inherent flexibility of the arms 13 so that the load frame 10, this time with its load carried on top rather than beneath would be winched up fully within and above the bottom of the skids, the helicopter then being permitted to land on the pads 40 on the skids. This configuration enables many light loads to be carried in stable platform condition.

Although the embodiments so far discussed are intended for use with existing skids of existing helicopters, by replacing the open trough members 40, 41 by suitable gripping devices and possibly by rearranging or adding further arms, the load frame 10 of the present invention may also be used with many medium and large helicopters which have retractable wheels and not skids, for landing gear. Thus an extension capable of gripping the underside of the fuselage of a wheeled aircraft would replace the trough members 40, 41.

What I claim as my invention is:

1. A load frame adapted for external attachment to a helicopter by its cargo hook, comprising a base means, a plurality of arms radiating from said base means and adapted to releasably engage predetermined parts on said helicopter, a strap-like member for engaging said cargo hook and winch means on said base means adapted, in operation, to winch-in said strap-like member and move said load frame into stable flight position beneath said helicopter with said arms firmly engaging said predetermined parts.

2. A reel for transportation externally of a helicopter, mounted on the load frame of claim 1.

3. A load frame adapted for external attachment to a helicopter by its cargo hook, comprising a base means having an upper face, a plurality of arms radiating from said upper face outwardly of said base means and adapted to releasably engage predetermined parts on said helicopter, a strap-like member for engaging said cargo hook and winch means on said upper face, adapted in operation, to winch-in said strap-like member and move said load frame into stable flight position beneath said helicopter with said arms firmly engaging said predetermined parts.

4. Apparatus as claimed in claim 3 in which said arms are pivotally mounted on said upperface in vertical pivots for pivotal movement in a horizontal plane.

5. A load frame adapted for external attachment to a helicopter by its cargo hook, comprising a base means, a plurality of arms radiating from said base means, engagement means on said arms adapted to releasably engage predetermined parts on said helicopter, a strap-like member for engaging said cargo hook and winch means on said base means adapted, in operation, to winch-in said strap-like member and move said load frame into stable flight position beneath said helicopter with said engagement means firmly engaging said predetermined parts; said arms being vertically resilient.

6. Apparatus as claimed in claim 5 in which said arms are pivotally mounted on said base means in horizontal pivots for pivotal movement in vertical planes.

7. Apparatus as claimed in claim 5 in which at least certain of said arms are length adjustable.

8. Apparatus as claimed in claim 5 in which said predetermined parts are the helicopter undercarriage skids and said engagement means comprise open trough-like members dimensioned to fit snugly under said skids.

9. Apparatus as claimed in claim 6 in which said trough-like members are padded.

10. Apparatus as claimed in claim 1 or claim 3 or claim 6 in which said winch means may be operated manually or under power.

11. Apparatus as claimed in claim 1 or claim 3 or claim 6 in which multi-purpose load attaching means is provided on said base.

12. Apparatus as claimed in claim 1 or claim 3 or claim 6 in which said base means is skeletal in form.

13. Apparatus as claimed in claim 1 or claim 3 or claim 6 in which said base means is skeletal in form and has a pair of longitudinally extending inverted T-shaped members projecting from the underside of said base means and forming a multi-purpose load attaching means.

14. A load frame adapted for external attachment to a helicopter by its cargo hook, comprising a base means, a plurality of arms radiating from said base means, engagement means on said arms adapted to releasably engage predetermined parts on said helicopter, a strap-like member for engaging said cargo hook and winch means on said base means adapted, in operation, to winch-in said strap-like member and move said load frame into stable flight position beneath said helicopter with said engagement means firmly engaging said predetermined parts; said engagement means being vertically resiliently biased.

15. In combination, a load frame adapted for external attachment to a helicopter by its cargo hook and comprising a base means, a plurality of arms radiating from said base means and adapted to releasably engage predetermined parts on said helicopter, a strap-like member for engaging said cargo hook and winch means on said base means adapted, in operation, to winch-in said strap-like member and move said load frame into stable flight position beneath said helicopter with said arms firmly engaging said predetermined parts; and a frame member on said load frame, and a reel member rotatably mounted on said frame member.

16. In combination, a load frame adapted for external attachment to a helicopter by its cargo hook and comprising a base means, a plurality of arms radiating from said base means and adapted to releasably engage predetermined parts on said helicopter, a strap-like member for engaging said cargo hook and winch means on said base means adapted, in operation, to winch-in said strap-like member and move said load frame into stable flight position beneath said helicopter with said arms firmly engaging said predetermined parts;

a ground-engaging rest frame; and a reel readily detachably mounted on said rest frame for being supported on said rest frame when said rest frame is on the ground, and means detachably mounting said reel and rest frame on said load frame.

17. A load frame as claimed in claim 16 in which said means to receive and support said reel are U-shaped channels adapted to engage a shaft of said reel.

* * * * *